(12) United States Patent
Runkel et al.

(10) Patent No.: US 12,343,806 B2
(45) Date of Patent: Jul. 1, 2025

(54) APPARATUS AND METHOD FOR GUIDING A CUTTING/DRILLING TOOL AND CAPTURING GENERATED FOREIGN MATERIAL

(71) Applicants: GENERAL ELECTRIC COMPANY, Schenectady, NY (US); ATLANTIC PLANT MAINTENANCE, INC., Pasadena, TX (US)

(72) Inventors: Christopher David Runkel, Greer, SC (US); Thomas Alan Mogle, II, Simpsonville, SC (US); Marcus Nolan Adams, Defuniak Springs, FL (US); Mark Andrew Haley, Garden Prairie, IL (US); Sandra Beverly Kolvick, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 376 days.

(21) Appl. No.: 17/945,458

(22) Filed: Sep. 15, 2022

(65) Prior Publication Data
US 2024/0091864 A1    Mar. 21, 2024

(51) Int. Cl.
*B23B 47/28*    (2006.01)
*B23P 6/00*    (2006.01)

(52) U.S. Cl.
CPC ............ *B23B 47/288* (2013.01); *B23P 6/002* (2013.01); *F05D 2230/80* (2013.01); *Y10T 29/49721* (2015.01)

(58) Field of Classification Search
CPC .............. B23D 59/006; B23D 59/0062; B23D 59/0064; B23D 47/02; B23D 45/16; B24B 27/06; F01D 25/28
(Continued)

(56) References Cited

U.S. PATENT DOCUMENTS 1,554,790 A    6/1920    Crowe
2,556,415 A    1/1950    Buck
(Continued)

FOREIGN PATENT DOCUMENTS

DE    7521801    11/1975
DE    202009015086    4/2010
(Continued)

OTHER PUBLICATIONS

International Searching Authority; Notification of Transmittal of The International Search Report and the Written Opinion of the International Searching Authority, or the Declaration; Date: Dec. 21, 2023.

*Primary Examiner* — Jason L Vaughan
(74) *Attorney, Agent, or Firm* — Grogan, Tuccillo & Vanderleeden, LLP

(57) ABSTRACT

A guide for cutting a dowel pin of a rotor assembly is provided. The guide includes a catch basin, including a first catch basin portion and a second catch basin portion, and a shim. The first catch basin portion and the second catch basin portion form a cutting tool receiver. The shim extends from a first edge having a cross-section that is complementary to a surface of the rotor assembly. The first catch basin portion and the second catch basin portion form a receptacle that accommodates and retains portions of a dowel pin during and after removal of the dowel pin from the rotor assembly. The cutting tool receiver is defined by a receiver edge configured to guide a cutting surface of a cutting tool through a cross-section of a dowel pin.

23 Claims, 19 Drawing Sheets

(58) Field of Classification Search
USPC .................................................. 409/137, 253
See application file for complete search history.

(56) References Cited

U.S. PATENT DOCUMENTS

| | | | |
|---|---|---|---|
| 4,464,085 A | | 8/1984 | Kalokhe |
| 4,822,219 A | * | 4/1989 | Wood ................. B23Q 11/0046 409/137 |
| 6,146,067 A | | 11/2000 | Owens |
| 6,851,900 B2 | * | 2/2005 | Tillemans .......... B23Q 11/0046 409/137 |
| 7,971,359 B2 | | 7/2011 | Bzorgi |
| 8,388,283 B2 | * | 3/2013 | Decker ................... B23B 5/166 409/137 |
| 10,166,664 B2 | | 1/2019 | Sajdak |
| 11,229,962 B1 | | 1/2022 | MacMurrough |
| 2008/0163733 A1 | | 7/2008 | Moser |

FOREIGN PATENT DOCUMENTS

| | | | |
|---|---|---|---|
| EP | 2105231 | A2 | 3/2009 |
| JP | 3139928 | | 3/2008 |

* cited by examiner

APPARATUS AND METHOD FOR GUIDING A CUTTING/DRILLING TOOL AND CAPTURING GENERATED FOREIGN MATERIAL

BACKGROUND

Technical Field

Embodiments of this disclosure relate generally to cutting tool guides, and more specifically, an apparatus and method of guiding a cutting tool in a confined space while also implementing a catch basin to capture foreign material generated via use of the cutting tool.

Discussion of Art

Rotary machines such as gas turbines contain rotor blades that must be removed for repair and routine service. The assembly that supports these rotor blades, as described in reference to FIGS. 1 and 2 below, requires the cutting and removal of dowel pins that are retained within the rotor assembly in confined and hard to reach locations. These dowel pins must be cut and removed in order to remove a circumferential lockwire that attaches the rotor blades to the rotor assembly. The dowel pins are installed in confined areas that are exposed only within the assembly and out of view.

The dowel pins are often cut by a cutting tool having a rotary cutting surface, e.g., a blade or wheel. Operation of a cutting tool in this manner has two potential drawbacks for the operation and maintenance of the rotary machine. First, the user must control the cutting tool and its rotary cutting surface entirely by hand. The dowel pins are in confined and hard to reach locations in large assemblies of costly elements and the portion of the dowel pin the must be cut is not easily visible during the removal. Operation of the rotary cutting surface in this location without any guide risks damaging the surrounding assembly and there is no system to prevent the user from passing the rotary cutting surface entirely through the cross-section of the dowel pin and into the lockwire, potentially requiring replacement of additional often costly parts.

Second, operating the rotary cutting surface to pass through the cross-section of the dowel pin generates foreign materials in the form of shavings. These foreign materials are cast out into the surrounding assembly in all directions and must be retrieved prior to placing the rotary machine back in service. Any foreign materials that are not captured and remain in the rotary machine could potentially damage numerous elements of the assembly including rendering the rotor assembly inoperable.

As a result, there exists a need for a device that can easily be attached to a variety of locations within a rotary machine, that guides the cutting surface of the cutting device, and that provides a receptacle to capture the foreign materials generated by the cutting and removal of the dowel pins.

BRIEF DESCRIPTION

The following presents a simplified summary of the disclosed subject matter in order to provide a basic understanding of some aspects of the various embodiments described herein. This summary is not an extensive overview of the various embodiments. It is not intended to exclusively identify key features or essential features of the claimed subject matter set forth in the Claims, nor is it intended as an aid in determining the scope of the claimed subject matter. Its sole purpose is to present some concepts of the disclosure in a streamlined form as a prelude to the more detailed description that is presented later.

In accordance with one embodiment, a guide for cutting a dowel pin of a rotor assembly is provided. The guide includes a catch basin including a first catch basin portion and a second catch basin portion and a shim. The first catch basin portion and the second catch basin portion forming a cutting tool receiver. The shim extends from a first edge having a cross-section that is complementary to a surface of the rotor assembly. The first catch basin portion and the second catch basin portion form a receptacle that accommodates and retains portions of a dowel pin during and after removal of the dowel pin from the rotor assembly. The cutting tool receiver is defined by a receiver edge configured to guide a cutting surface of a cutting tool through a cross-section of a dowel pin.

In accordance with another embodiment, a method of cutting a dowel pin retained within a rotor assembly is provided. The method includes placing a shim on a receiving surface of the rotor assembly, placing a first catch basin portion on the shim, securing the first catch basin portion to the rotor assembly using a foot of the first catch basin portion, inserting a cutting tool into a receiver edge of the first catch basin, placing a second catch basin portion on the shim to form a hollow receptacle with the first catch basin portion, and operating a rotary cutting surface of the cutting tool to pass through a cross-section of the dowel pin. The rotary cutting surface is contained within the receptacle during operation of the cutting tool.

In accordance with an alternate embodiment, a guide is provided for cutting a dowel pin of a rotor assembly that includes a catch basin forming a cutting tool receiver and a receptacle. The receptacle accommodates and retains portions of a dowel pin during and after removal of the dowel pin from the rotor assembly and the cutting tool receiver has a receiver edge that guides a cutting surface of a cutting tool through a cross-section of a dowel pin. The receiver edge is a continuous edge that retains a rotary cutting surface of the cutting tool within the receptacle.

DRAWINGS

The present invention will be better understood from reading the following description of non-limiting embodiments, with reference to the attached drawings, wherein below:

DETAILED DESCRIPTION

Example embodiments of the present invention will be described more fully hereinafter with reference to the accompanying drawings, in which some, but not all embodiments are shown. Indeed, the present invention may be embodied in many different forms and should not be construed as limited to the embodiments set forth herein; rather, these embodiments are provided so that this disclosure will satisfy applicable legal requirements. For like numbers may refer to like elements throughout.

This disclosure relates generally to a guide for cutting dowel pins of a rotary machine. Although the various embodiments are described with respect to a rotor assembly, the guide disclosed herein is suitable for any application involving confined and hard to reach pins or similar fasteners that must be removed without generating foreign materials in the surrounding assembly.

Figure 1:
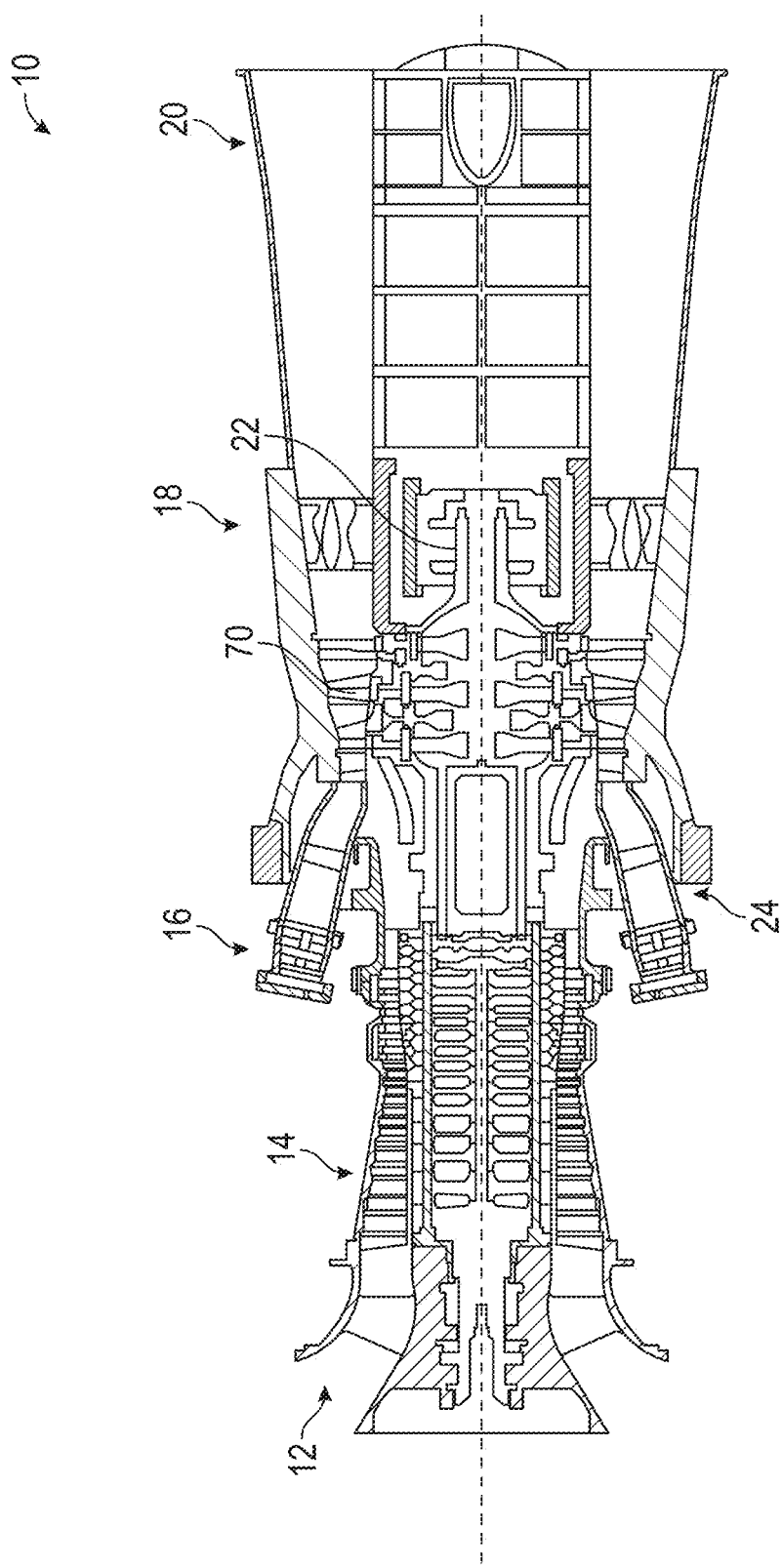
FIG. 1 shows a schematic section view of an exemplary rotary machine.

Turning now to the figures, FIG. 1 shows a schematic section view of an exemplary rotary machine 10 with which embodiments of the current disclosure may be used. In the exemplary embodiment, rotary machine 10 is a gas turbine that includes an intake section 12, a compressor section 14 coupled downstream from the intake section 12, a combustor section 16 coupled downstream from the compressor section 14, a turbine section 18 coupled downstream from the combustor section 16, and an exhaust section 20 coupled downstream from the turbine section 18. In the exemplary embodiment, the turbine section 18 is coupled to compressor section 14 via a rotor assembly 22. It should be noted that, as used herein, the term "couple" is not limited to a direct mechanical, electrical, and/or communication connection between components, but may also include an indirect mechanical, electrical, and/or communication connection between components, but may also include an indirect mechanical, electrical, and/or communication connected between multiple components.

In combustor section 16, the compressed air is mixed with fuel and ignited to generate combustion gases that are channeled towards the turbine section 18. More specifically, combustor section 16 includes at least one combustor 24, in which a fuel, for example, natural gas and/or fuel oil, is injected into the air flow, and the fuel-air mixture is ignited to generate high temperature combustion gases that are channeled towards the turbine section 18. The turbine section 18 converts the thermal energy from the combustion gas stream to mechanical rotational energy. More specifically, the combustion gases impart rotational energy to at least one circumferential row of rotor blades 70 coupled to rotor assembly 22 within the turbine section 18.

Figure 2:
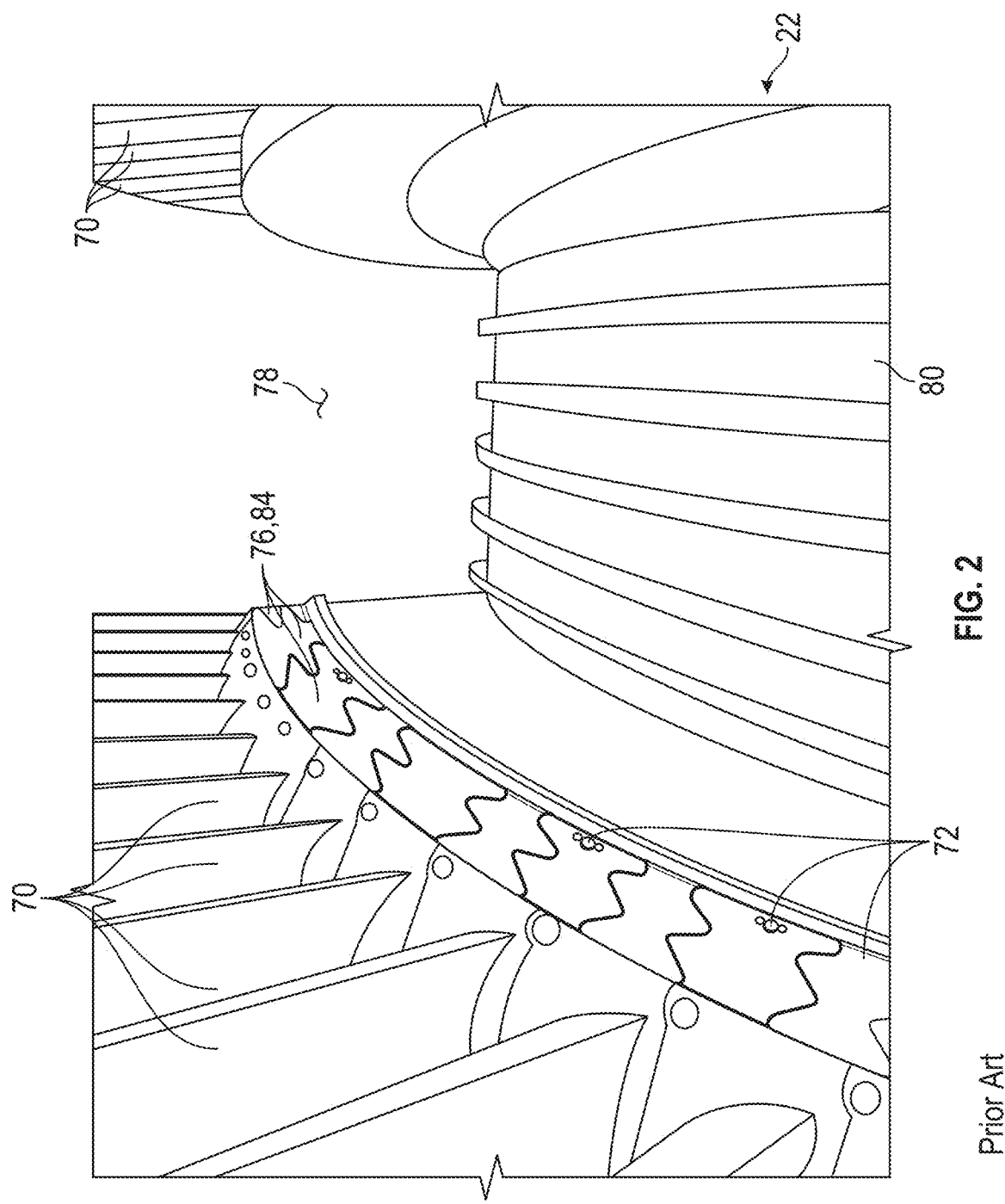
FIG. 2 shows a perspective view of an exemplary confined space disposed axially between two adjacent rows of rotor blades of the rotary machine of FIG. 1.

FIG. 2 is a schematic perspective view of an exemplary confined space 78, disposed axially between two adjacent rows of exemplary rotor blades 70 of the turbine section 18 (shown in FIG. 1). More specifically, in the view of FIG. 2, the turbine section 18 is at least partially disassembled, such that stator vanes are no longer disposed between the rows of rotor blades 70. Each rotor blade 70 includes a dovetail 76 that is coupled to the rotor assembly 22 by an axially extending (i.e., parallel to the rotor assembly 22) dowel pin 72 that retains a lockwire 74 extending circumferentially within the rotor assembly 22 (as depicted and described in detail with reference to FIGS. 3-5). The dowel pin 72 is mounted flush with the surface of the rotor assembly 22. The lockwire 74 circumferentially surrounds a plurality of dowel pins 72 and engages the dowel pins 72 at substantially the center of the axial length of the dowel pin 72.

Figure 3:
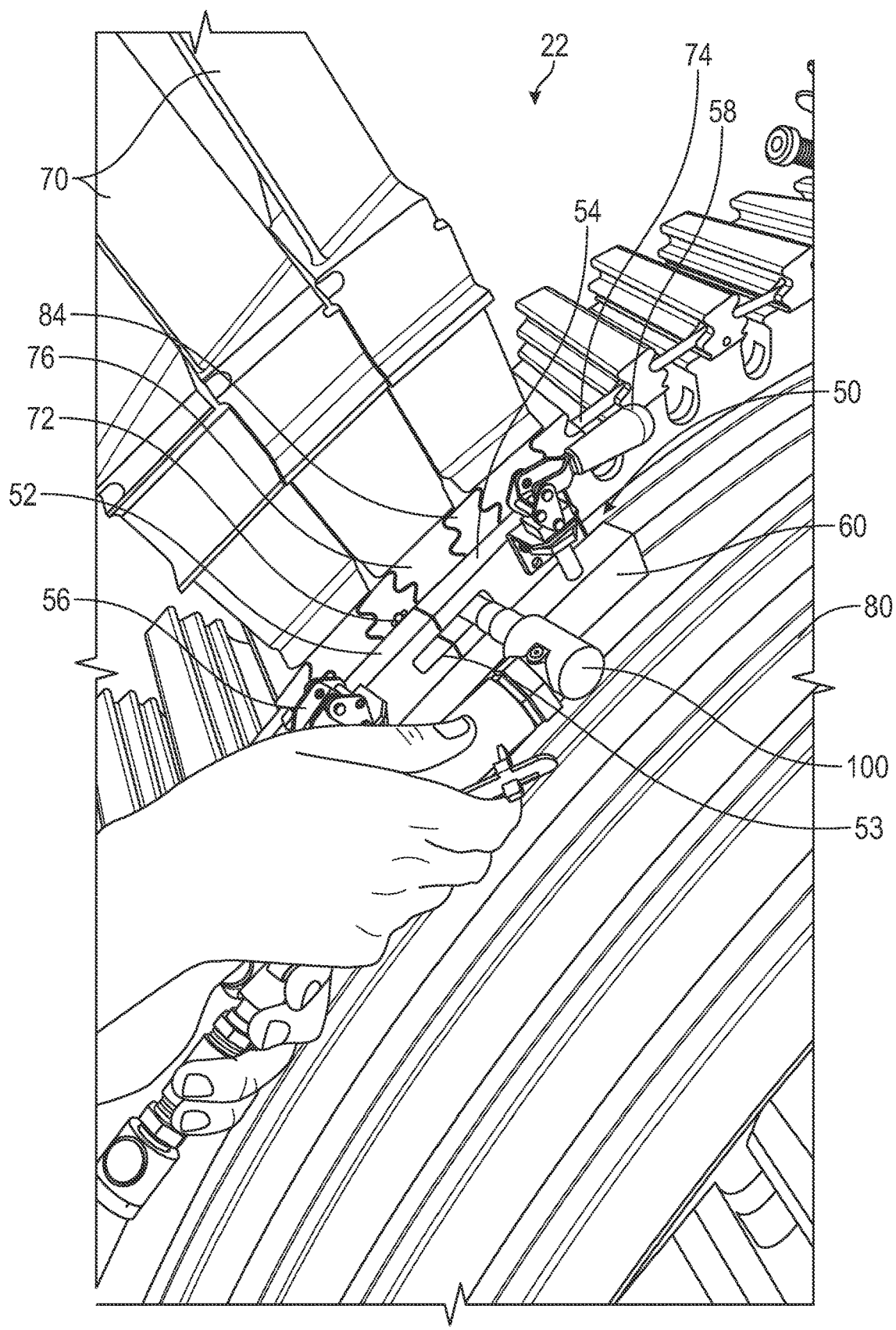
FIG. 3 shows a perspective view of a first embodiment of a guide installed within the confined space of FIG. 2, according to an embodiment of the invention.
Figure 4:
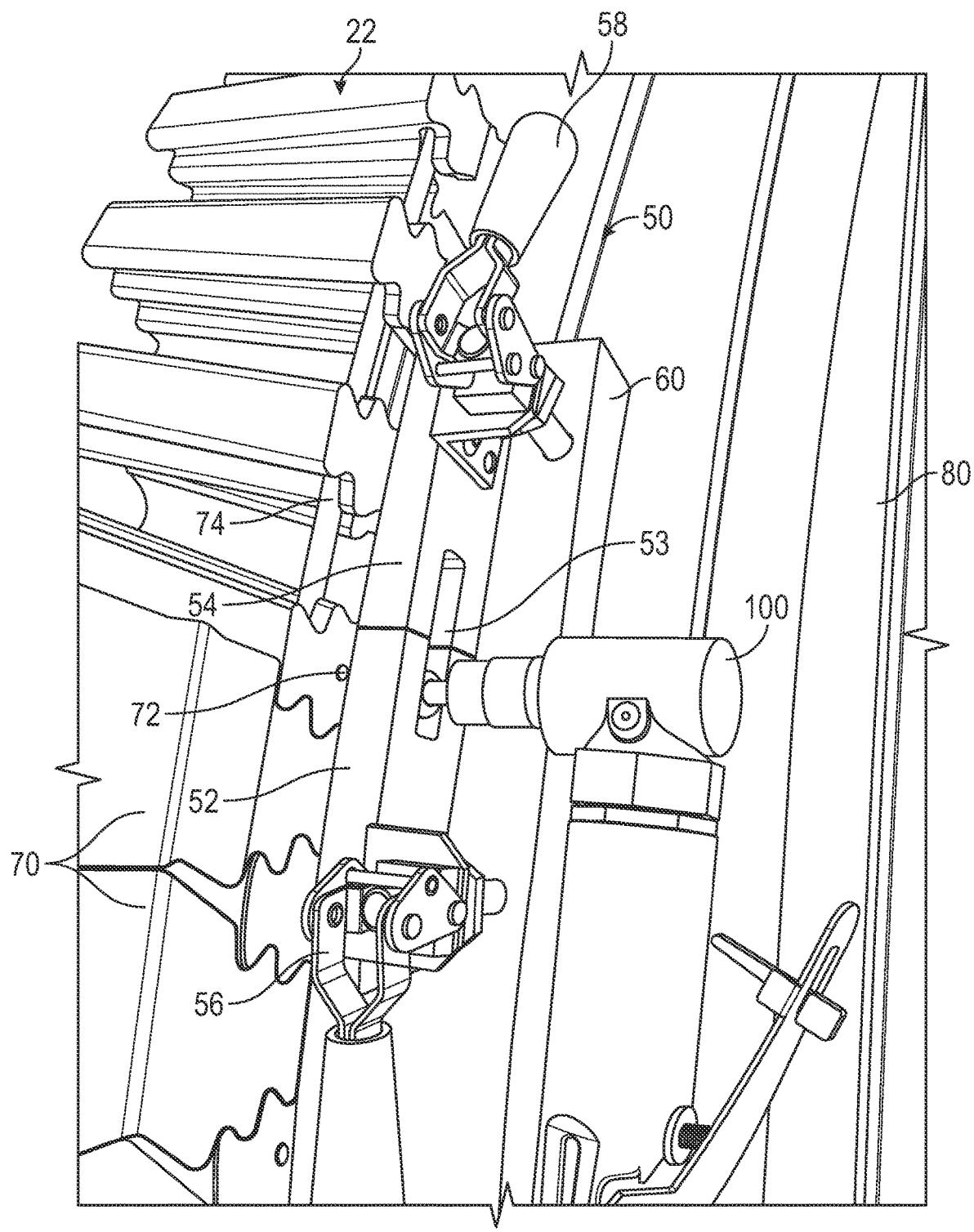
FIG. 4 shows a top view of the guide of FIG. 3, according to an embodiment of the invention.
Figure 9:
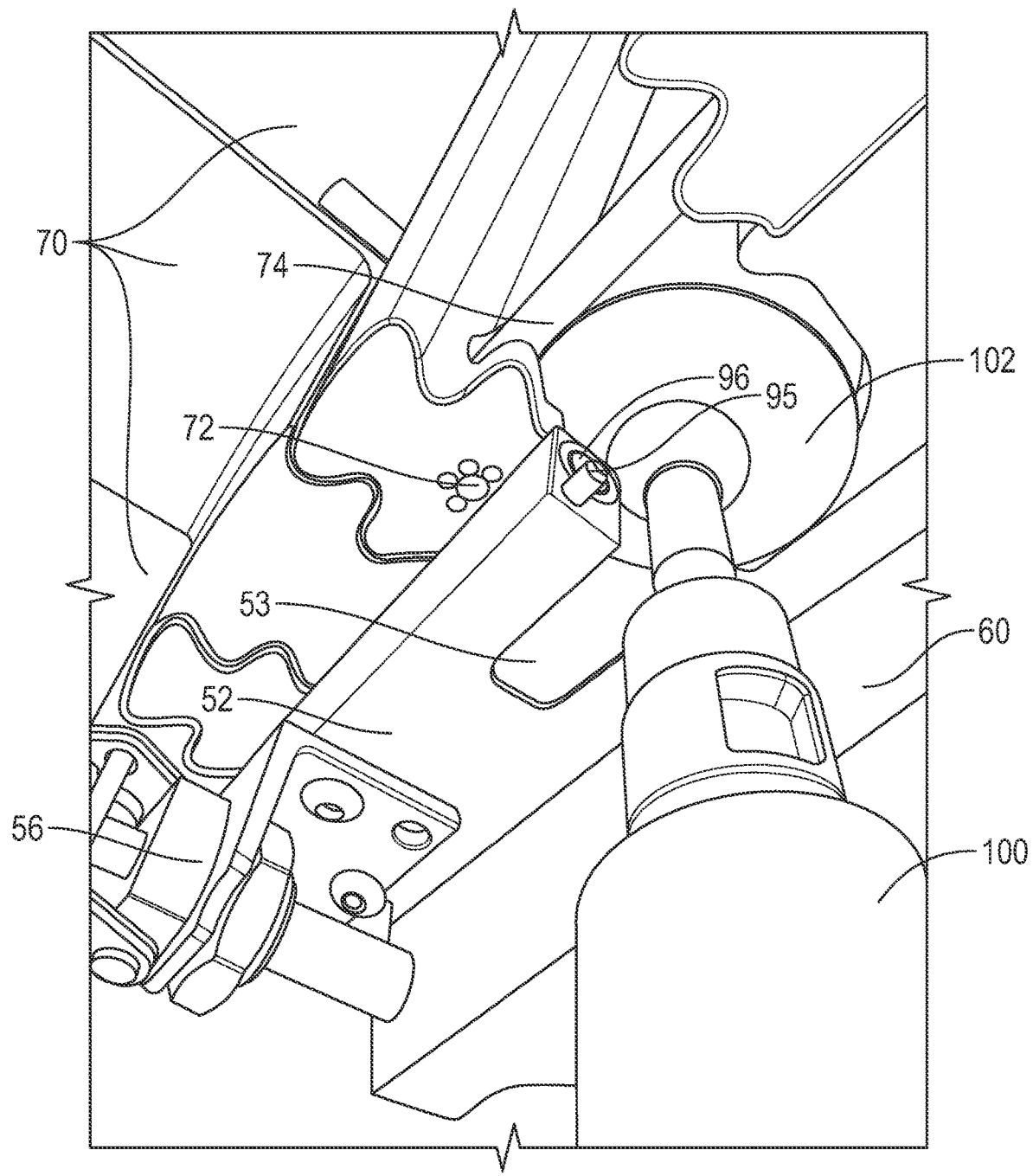
FIG. 9 shows a perspective view of the guide of FIG. 3, with the second catch basin portion removed, according to an embodiment of the invention.
Figure 10:
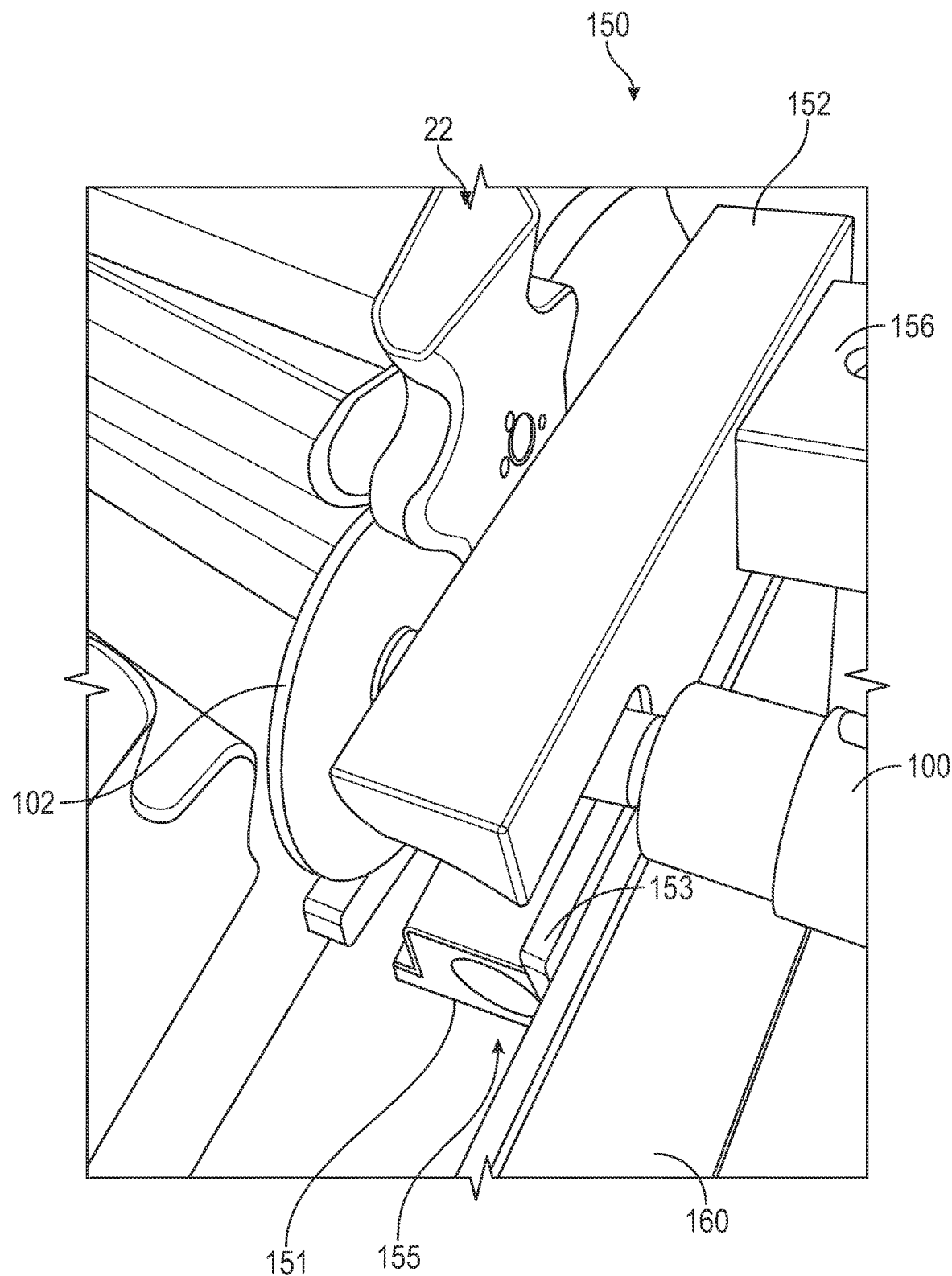
FIG. 10 shows a perspective view of a second embodiment of a guide installed within the confined space of FIG. 2, with the second catch basin portion removed, according to an embodiment of the invention.

FIG. 3 is a perspective view of an exemplary tool 100 configured to be deployed, such as within confined space 78, to remove the dowel pin 72 allowing removal of the lockwire 74 from the rotor assembly 22. A guide 50 receives the tool 100 for cutting the dowel pin 72, guides a rotary cutting surface 102 (as depicted in FIG. 9) of the tool 100 to cut the dowel pin 72, and retains the foreign materials generated by the cutting and/or removal of the dowel pin 72.

Figure 5:
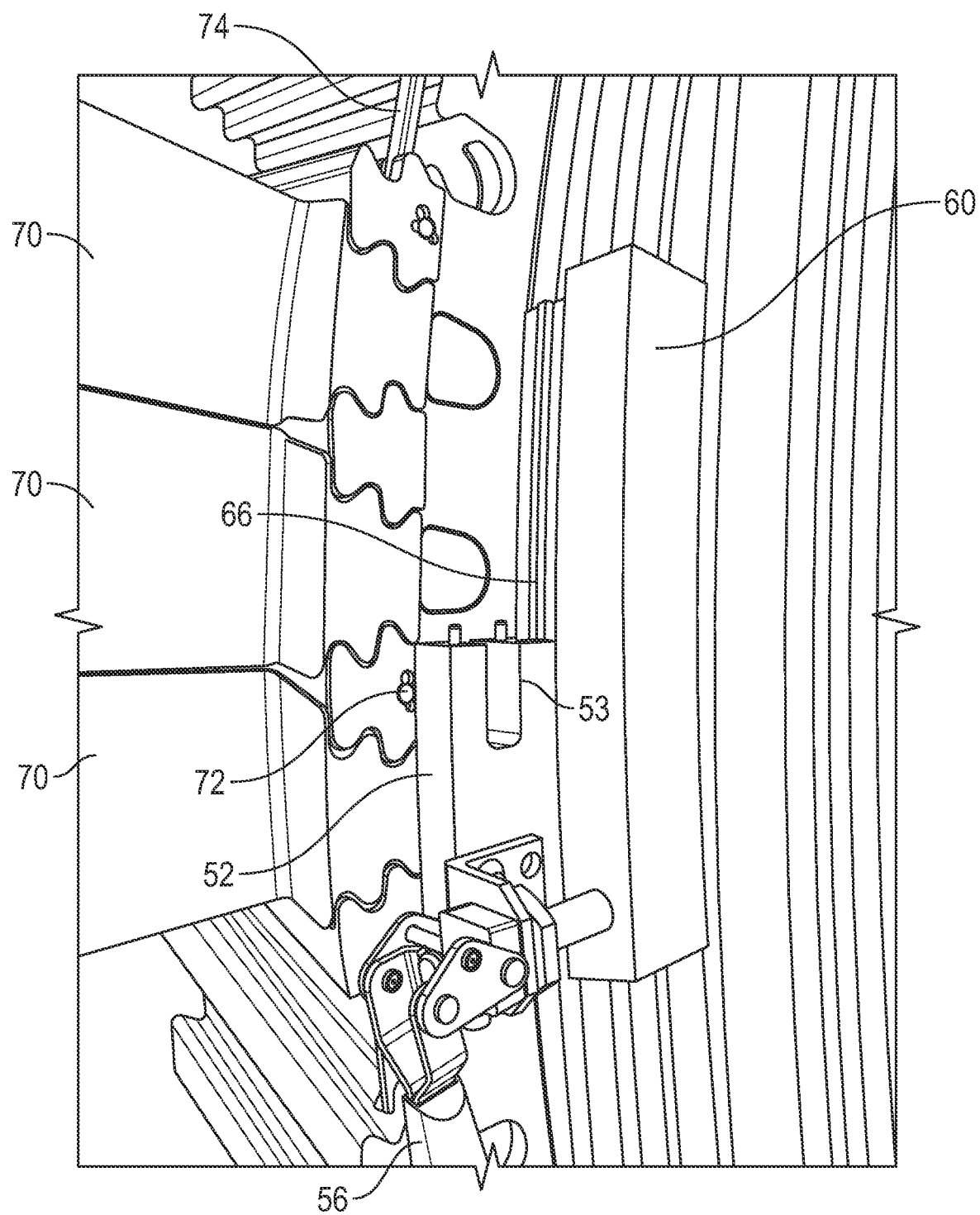
FIG. 5 shows a top view of the guide of FIG. 3, with the second catch basin portion and the cutting tool removed, according to an embodiment of the invention.
Figure 6:
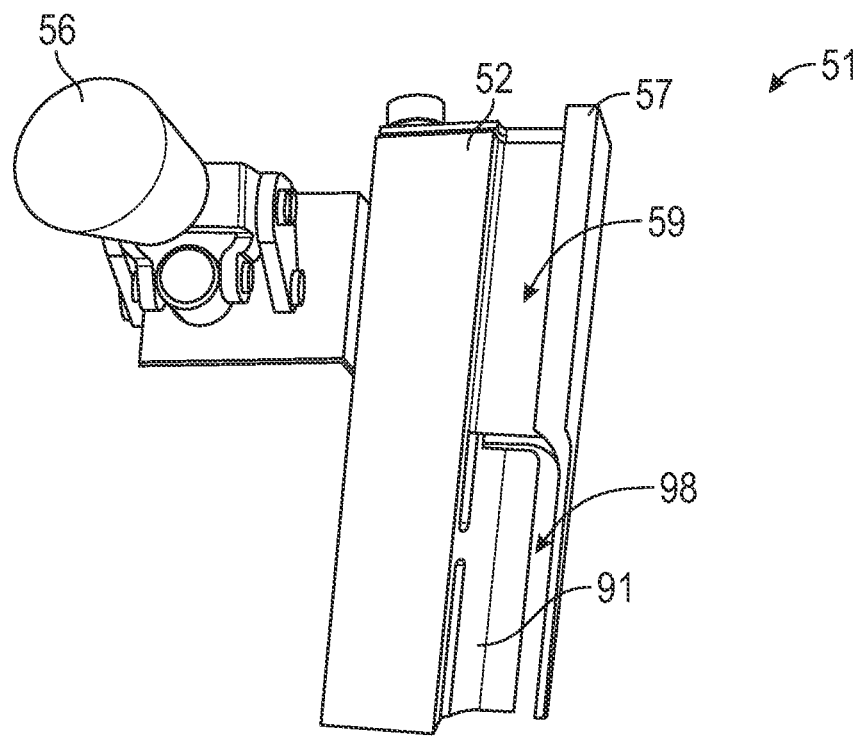
FIG. 6 shows a top view of the first catch basin portion and the second catch basin portion of the guide of FIG. 3, according to an embodiment of the invention.
Figure 6:
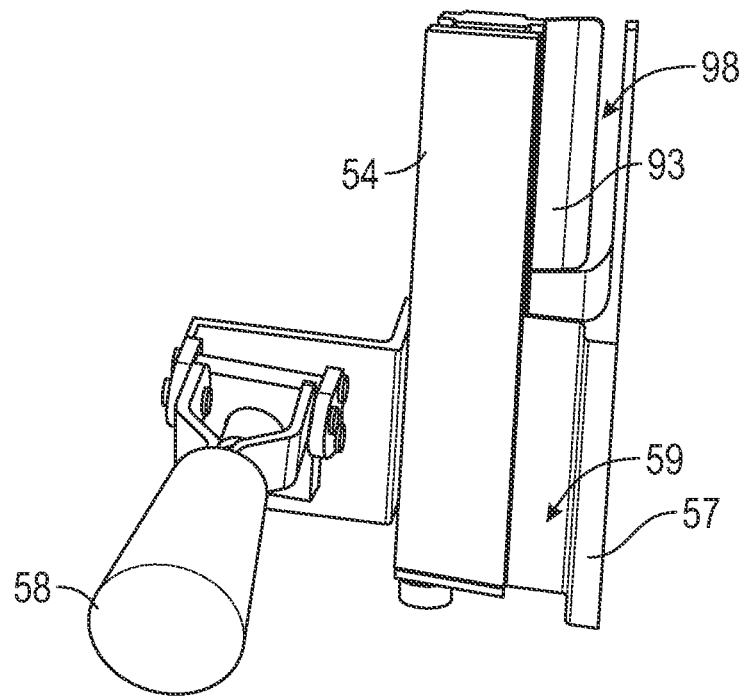
Figure 7:
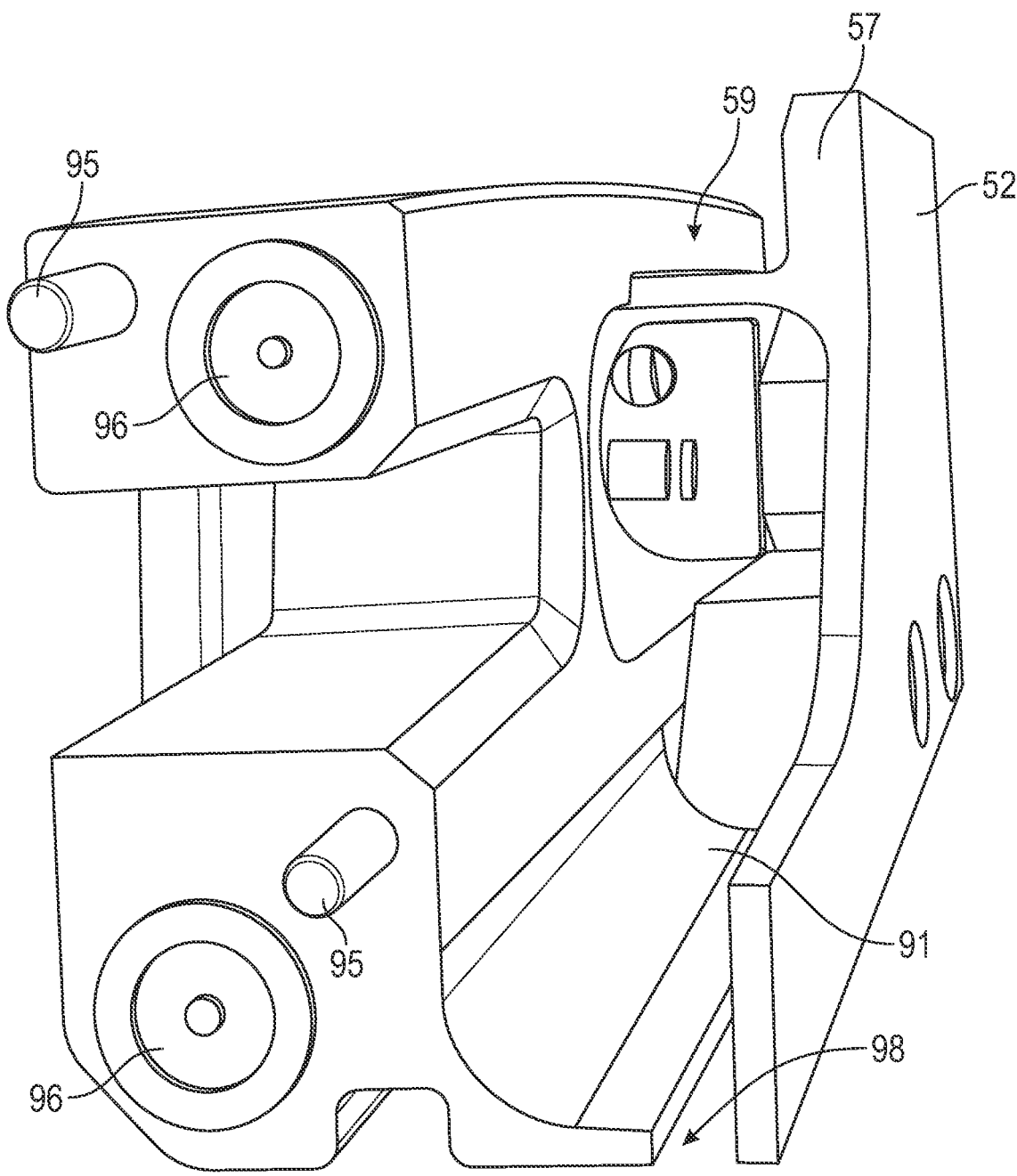
FIG. 7 shows a side view of the second catch basin portion of FIG. 3, according to an embodiment of the invention.
Figure 8:
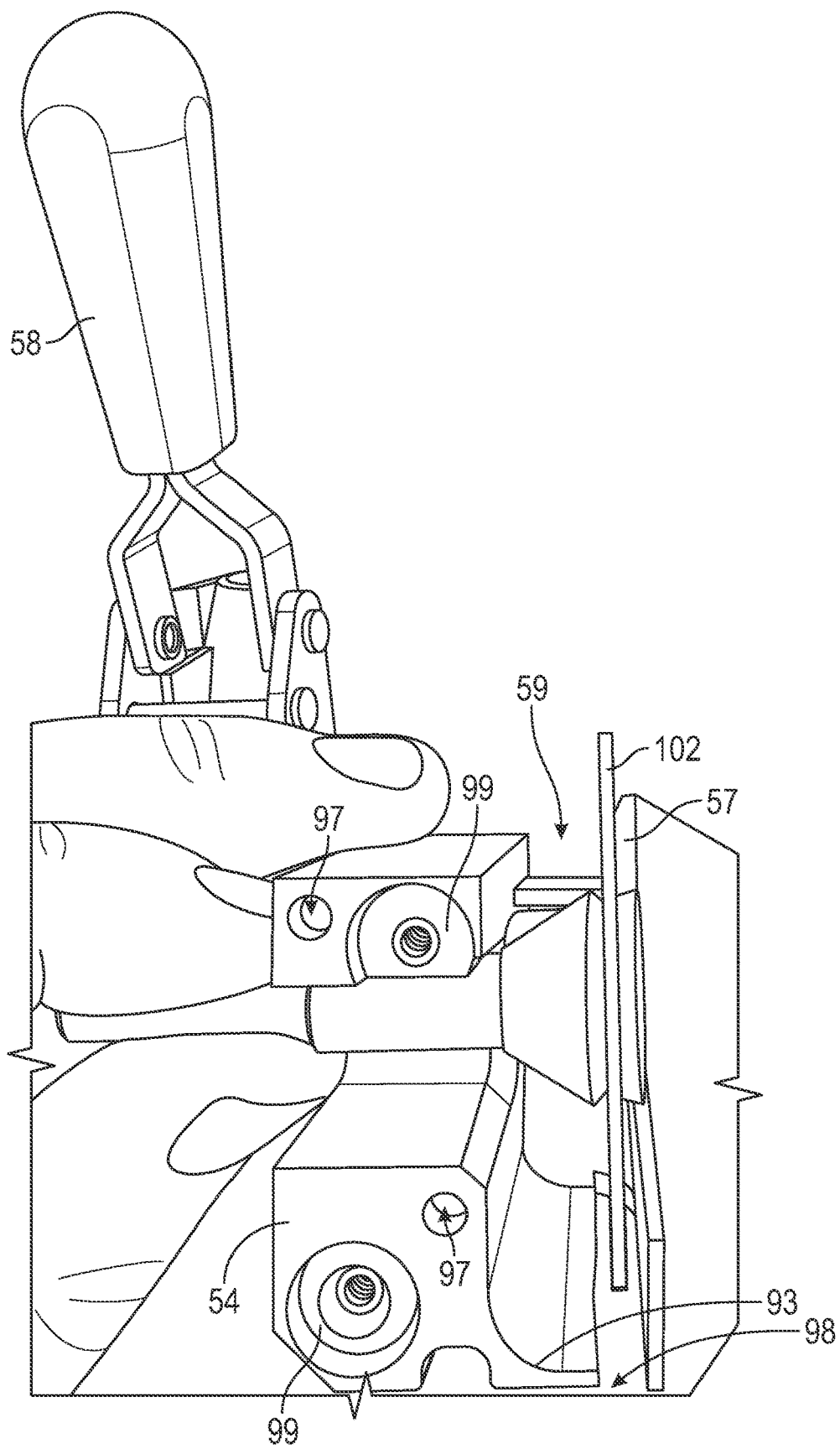
FIG. 8 shows a side view of the first catch basin portion of FIG. 3, according to an embodiment of the invention.

With reference to FIGS. 3-6, in the exemplary embodiment, guide 50 has a substantially hollow or open interior/receptacle 55 that is configured to, among other things, receive and store foreign material generated through use of tool 100. The receptable 55 is defined by a catch basin 51, including a first catch basin portion 52 and a second catch basin portion 54 configured for removable attachment to the first catch basin portion 51, and a shim 60. When secured together, the first catch basin portion 52 and the second catch basin portion 54 form a cutting tool guide/receiver defined by a slot-like aperture referred to herein as the receiver edge 53. The first catch basin portion 52 and the second catch basin portion 54 form a receptacle 55 that accommodates and retains portions of the dowel pin 72 during and after removal of the dowel pin 72 from the rotor assembly 22 (as depicted in FIGS. 6-8). The shim 60 extends from a first edge 62 having a cross-section that is complementary to a circumferential surface 86 of the spacer 80 to a second edge 64 having a cross-section that is complementary to a structural surface 84 of the rotor assembly 22.

Referring to FIG. 6, in an embodiment, the separable guide 50 includes the first catch basin portion 52 having a first inner surface 91 defining a first portion of the receptacle 55 and the second catch basin portion 54 having a second inner surface 93 defining a second portion of the receptacle 55. The receiver edge 53 is configured to guide the cutting surface 102 of the cutting tool 100 through a cross-section of the dowel pin 72. That is, the edge 53 forms a slot like aperture that limits travel of the cutting tool 100 during use. Catch basins formed from less than or more than two pieces do not depart significantly from the invention disclosed herein. In some non-depicted embodiments, the catch basin is formed from a single member having a cover to allow for insertion of the cutting tool and/or removal of the cut materials.

In the embodiments depicted in FIGS. 3-13, the receiver edge 53 is a continuous edge that receives the cutting tool 100 and guides the rotary cutting tool 100 and surface 102 within the receptacle 55. The continuous edge of the receiver edge 53 affixes the cutting tool 100 to the guide 50 while ensuring accurate operation of the rotary cutting surface 102. In some embodiments, the receiver edge 53 is configured to guide the cutting surface 102 of the cutting tool 100 through the cross-section of the dowel pin 72 without substantially penetrating the lockwire 74 retained within the rotor assembly 22 by the dowel pin 72. In other words, the receiver edge 53 ensures that the rotary cutting surface 102 only contacts the dowel pin 72.

Referring to FIGS. 5-7, a portion of the inner surfaces 91, 93 of the first catch basin portion 52 and the second catch basin portion 54 are complementary in shape to the rotary cutting surface 102 of the cutting tool 100 (depicted in detail in FIG. 7). The shim 60 has an interior edge 66 (depicted in detail in FIG. 5) that is complementary in shape to the rotary cutting surface 102 of the cutting tool 100. In some embodiments, these surfaces help guide the rotary cutting surface 102 and may be specifically angled to promote effective cutting of the dowel pin 72 without damaging the surrounding rotor assembly 22. In the embodiment depicted in FIGS. 3-9, each catch basin portion 52, 54 has a cutting slot 98 (as depicted in FIGS. 6-8 in detail) that accommodates and allows passage of the rotary cutting surface 102 without allowing a substantial amount the cut foreign materials to exit the receptacle 55. Each of the catch basin portions 52, 54 extends to a receiver tab 57 that provides a point of contact between the rotor assembly 22 and the catch basin portions 52, 54 to further stabilize the guide 50. In the embodiment depicted in FIGS. 3-9, each receiver tab 57 defines an assembly groove 59 that accommodates and/or secures the catch basin portions 52, 54 to the surrounding assembly.

In the embodiment depicted in FIGS. 3-9, the first catch basin portion 52 has a first foot 56 and the second catch basin portion 54 has a second foot 58 configured to releasably mount the catch basin 51 and the shim 60 to the rotor assembly 22. The receiver tab 57 pushes against the lockwire 74 to serve as an engagement point when the feet 56, 58 are engaged. Including only a single foot and/or altering the mechanism for affixing the catch basin 51 to the rotor assembly 22 does not depart from the invention disclosed herein.

Referring to FIGS. 7 and 8, in some embodiments the catch basin 51 includes a basin lock configured to affix the first catch basin portion 52 to the second catch basin portion 54. In the depicted embodiment, the basin lock includes two pins 95 extending from the first catch basin portion 52 that engage complementary apertures 97 in the second catch basin portion 54 and optional basin magnets 96 retained within the first catch basin portion 52 engage complementary receivers 99 in the second catch basin portion 54. The pin 95 and aperture 97 engagement prevents movement of the catch basin portions 52, 54 relative to one another and the basin magnet 96 and receiver 99 connection prevents the splitting of the catch basin 51 into the catch basin portions 52, 54.

In other embodiments, the portions 52 and 54 may be secured together via various attachment mechanisms including, but not limited to, hook and loop fasteners, quick release pins, clasps, clamps, and flexible/rotatable/overhang latches.

In other embodiments, the catch basin 51 may include a hole or passage that allows for connection of a vacuum (not shown). Such a hole would allow for removal of any foreign material that has accumulated in the basin 51. As will be appreciated, the hole/passage may be located in a variety of positions, as long at the hole provides for access to the interior of the basin from an accessible portion of the basin exterior.

The catch basin 51 is compatible with alternate embodiments of the shim 60 having a different size and/or shape to account for a variety of structural and circumferential surfaces on the rotor assembly 22 and/or the spacer 80. In the embodiment depicted in FIGS. 3-9, the shim 60 contributes to forming the receptacle 55 with the catch basin 51. A method 800 of removing the dowel pins 72, as described in detail below, includes the use of a variety of shims depending on the application. FIGS. 9, 10 and 12-18 depict exemplary embodiments of shims 60, 160, 260, 360, 460, 560, 660.

Figure 11:
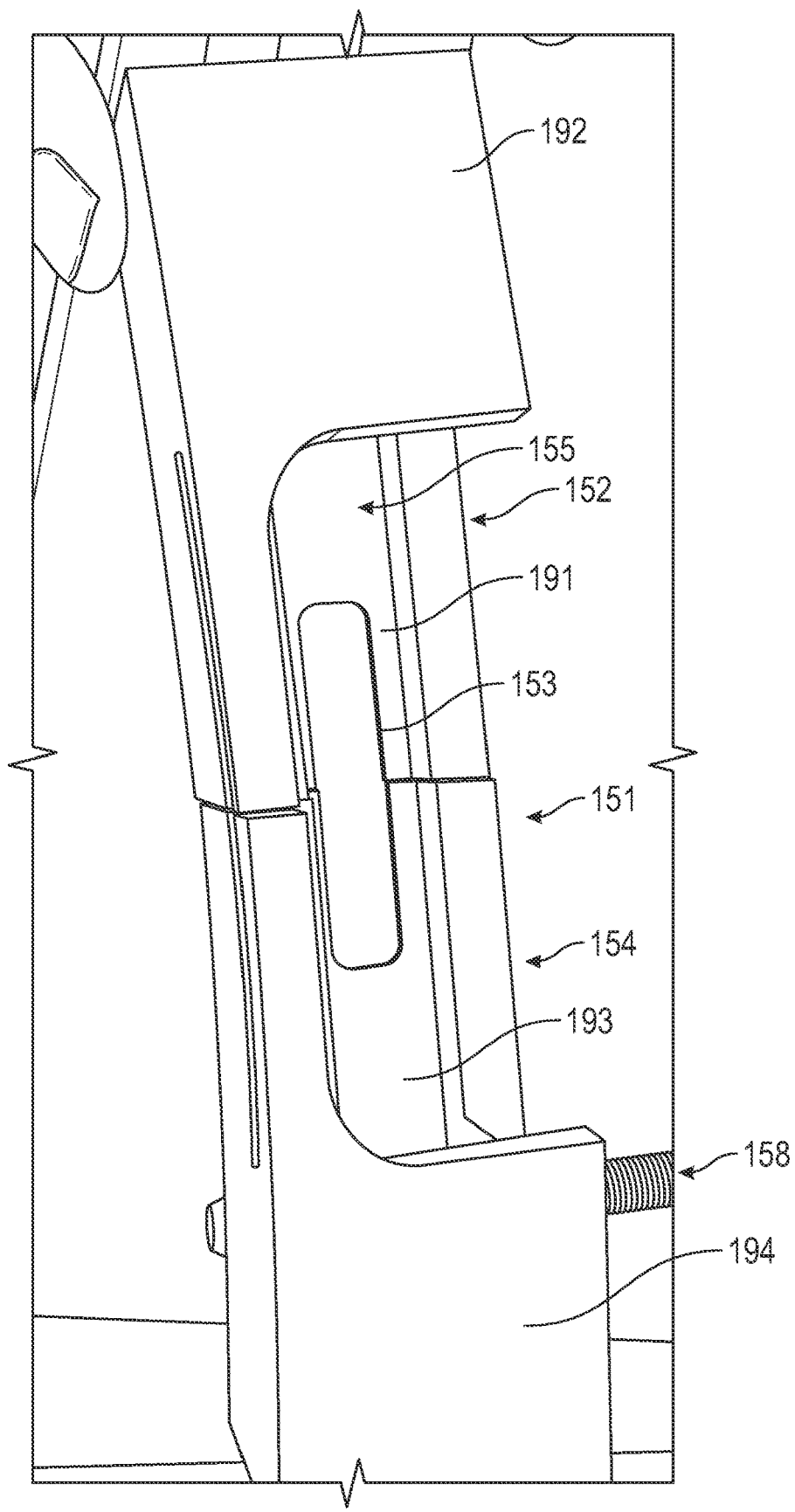
FIG. 11 shows a bottom view of the catch basin of FIG. 10, according to an embodiment of the invention.
Figure 12:
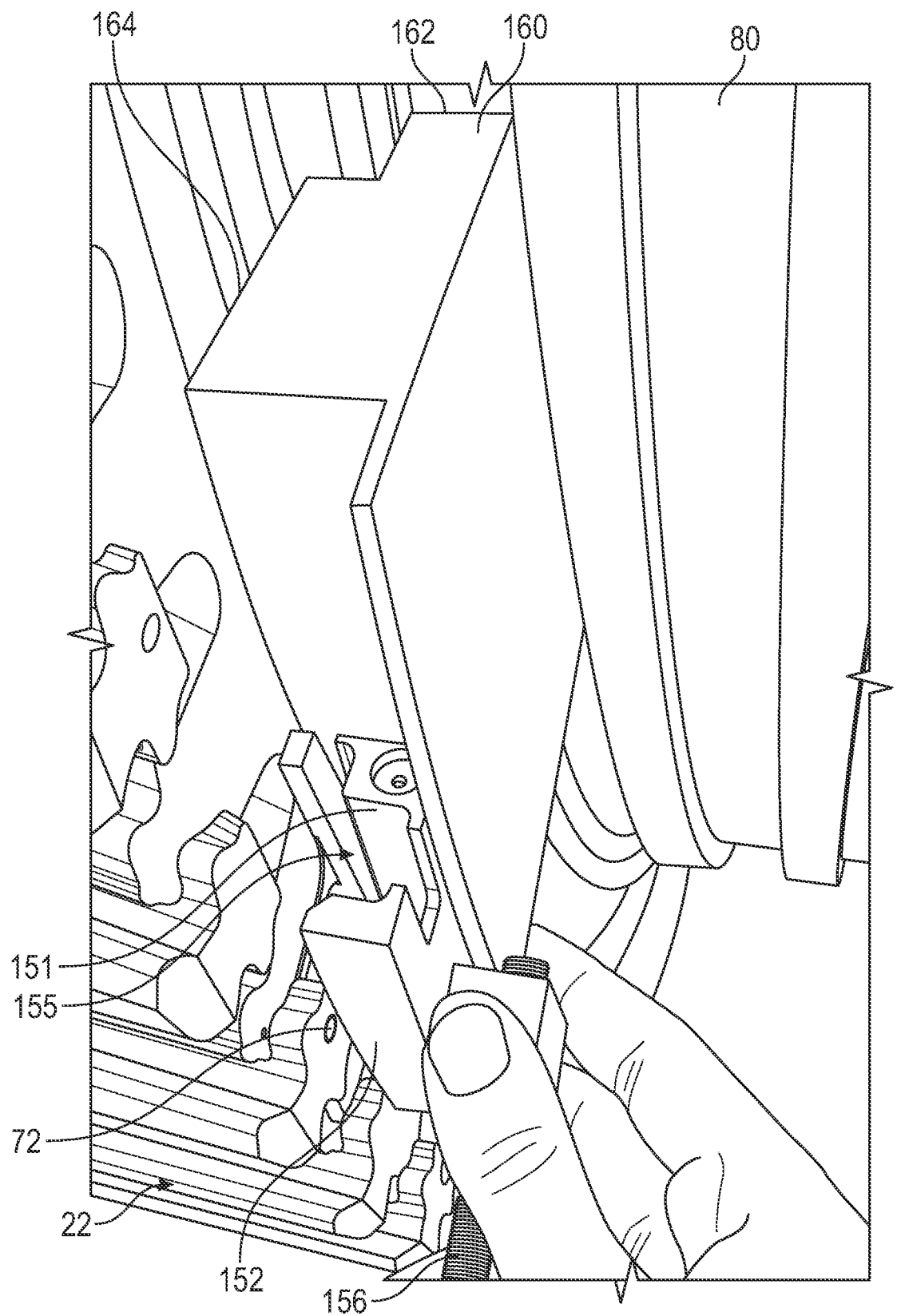
FIG. 12 shows a perspective view of the guide of FIG. 10, according to an embodiment of the invention.
Figure 13:
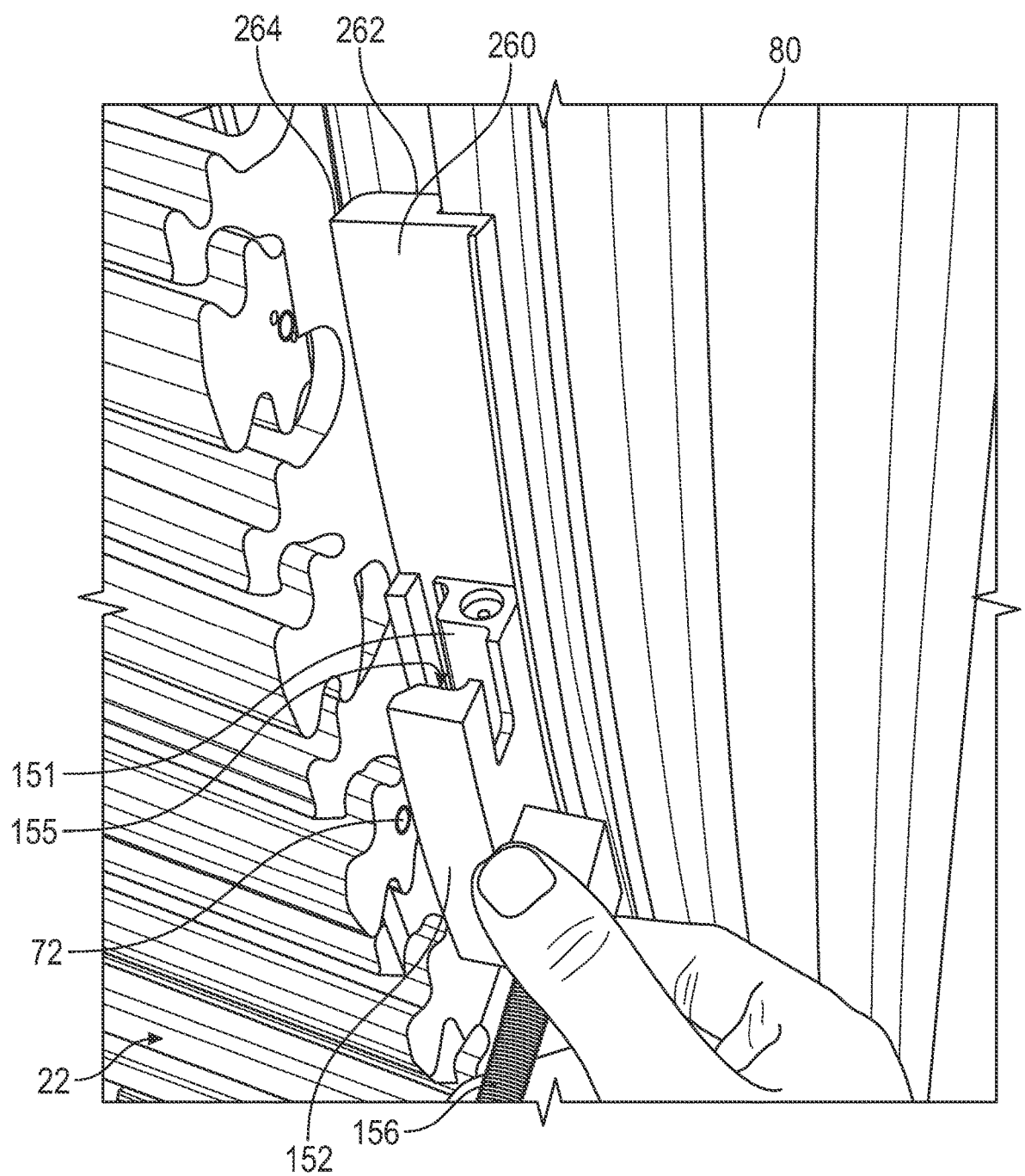
FIG. 13 shows a perspective view of the guide of FIG. 10, with an alternate embodiment of a shim, according to an embodiment of the invention.
Figure 14:
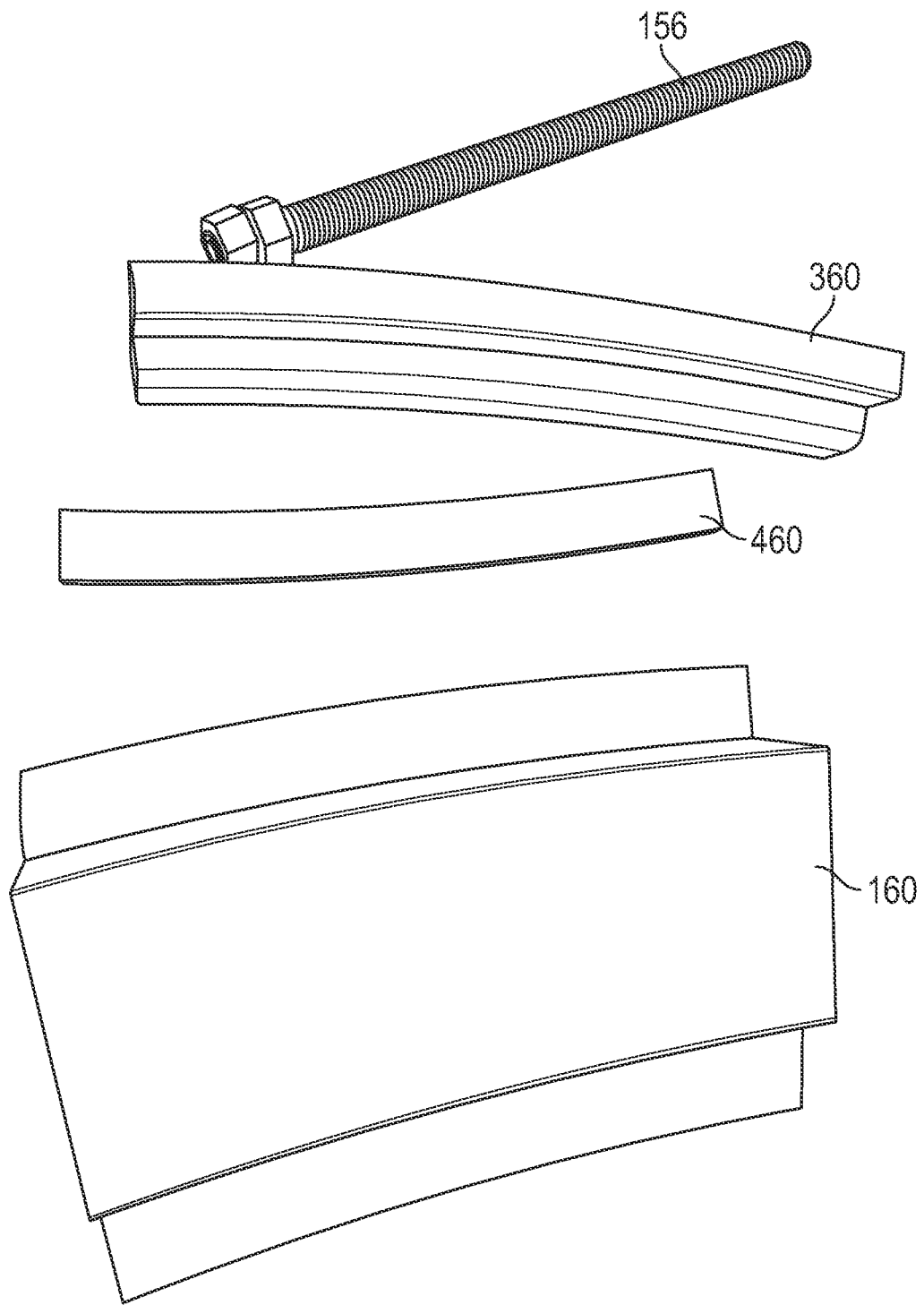
FIG. 14 shows alternate embodiments of shims and a first foot compatible with the guide of FIG. 10, according to an embodiment of the invention.
Figure 15:
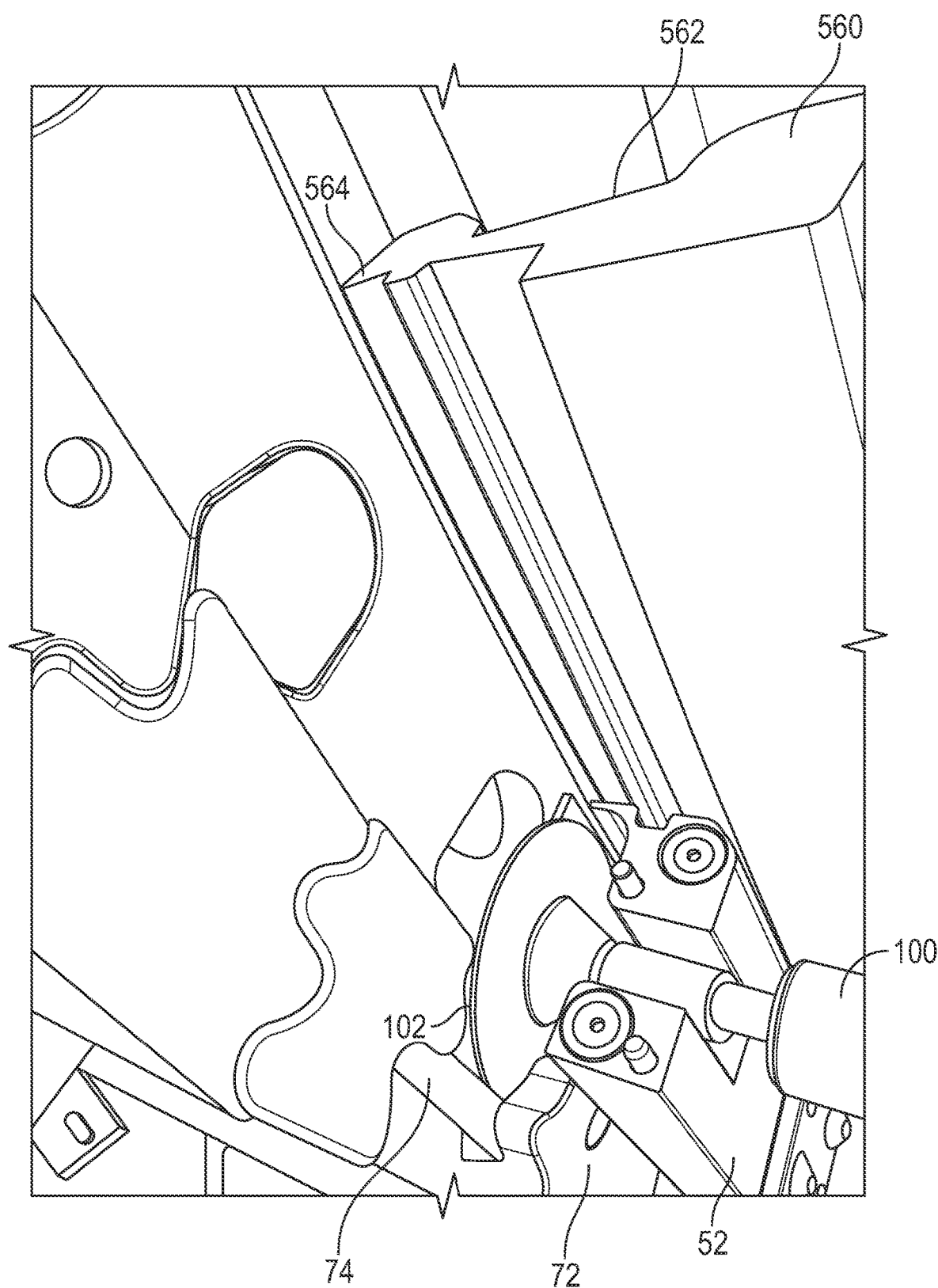
FIG. 15 shows a perspective view of the guide of FIG. 3, with the second catch basin portion removed and including an alternate embodiment of a shim, according to an embodiment of the invention.
Figure 16:
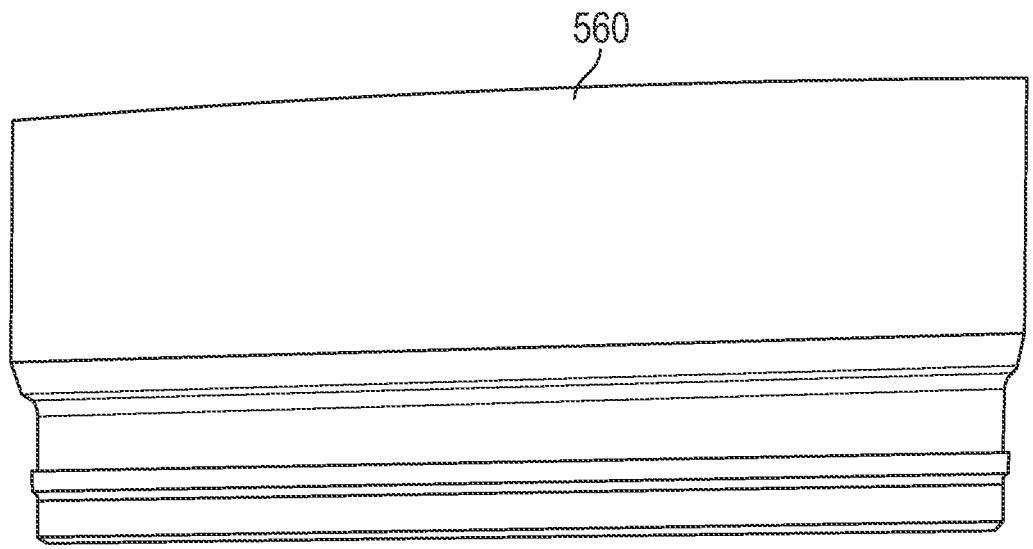
FIG. 16 shows the shim of FIG. 15, according to an embodiment of the invention.
Figure 17:
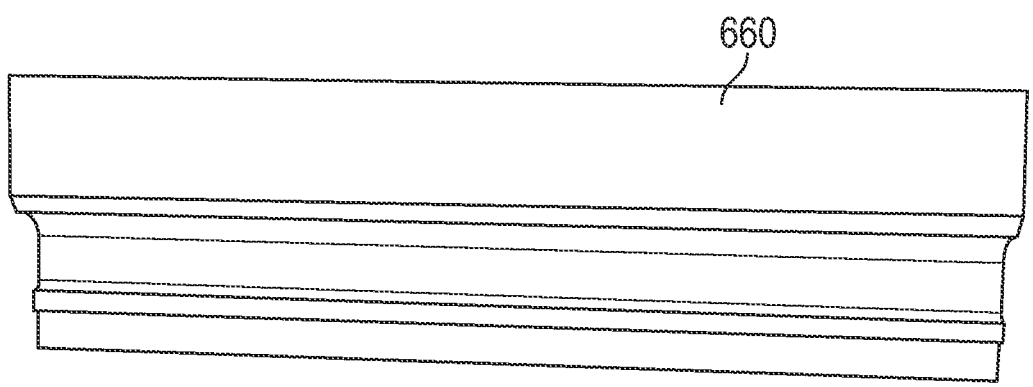
FIG. 17 shows an alternate embodiment of a shim compatible with the guide of FIG. 3, according to an embodiment of the invention.
Figure 18:
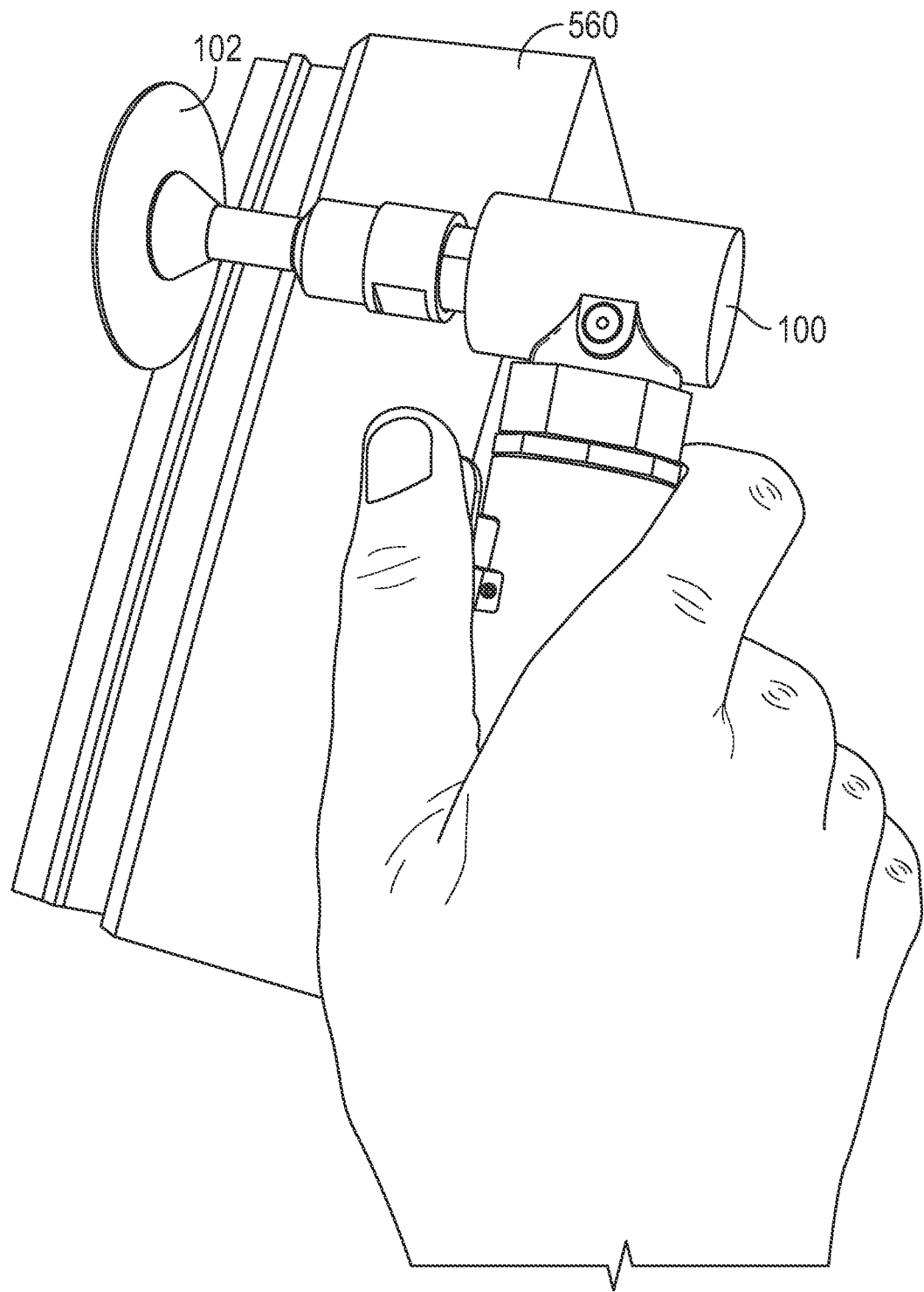
FIG. 18 shows the shim of FIG. 16 and a cutting tool, according to an embodiment of the invention.

FIGS. 10-14 depict an alternate embodiment of the guide 150. The guide 150 is similar in functionality and structure to the guide 50 described above with respect to FIGS. 3-9. FIGS. 12 and 13 specifically depict a user replacing shim 160 with shim 260 to be able to accurately guide the rotary surface 102 to cut the dowel pin 72 (the cutting tool 100 is omitted for clarity). Once a user determines the appropriate shim for the specific dowel pin, the guide 150 is assembled and the catch basin 151 fastens to the spacer 80 using a first foot 156 and/or a second foot 158.

Referring to FIG. 11, a first surface 192, 194 of the catch basin portions 152, 154, respectively includes a surface texture to further stabilize the connection between the catch basin 151 and the shim 160. In some non-depicted embodiments, the shim is incorporated into one or both of the catch basin portions.

Figure 19:
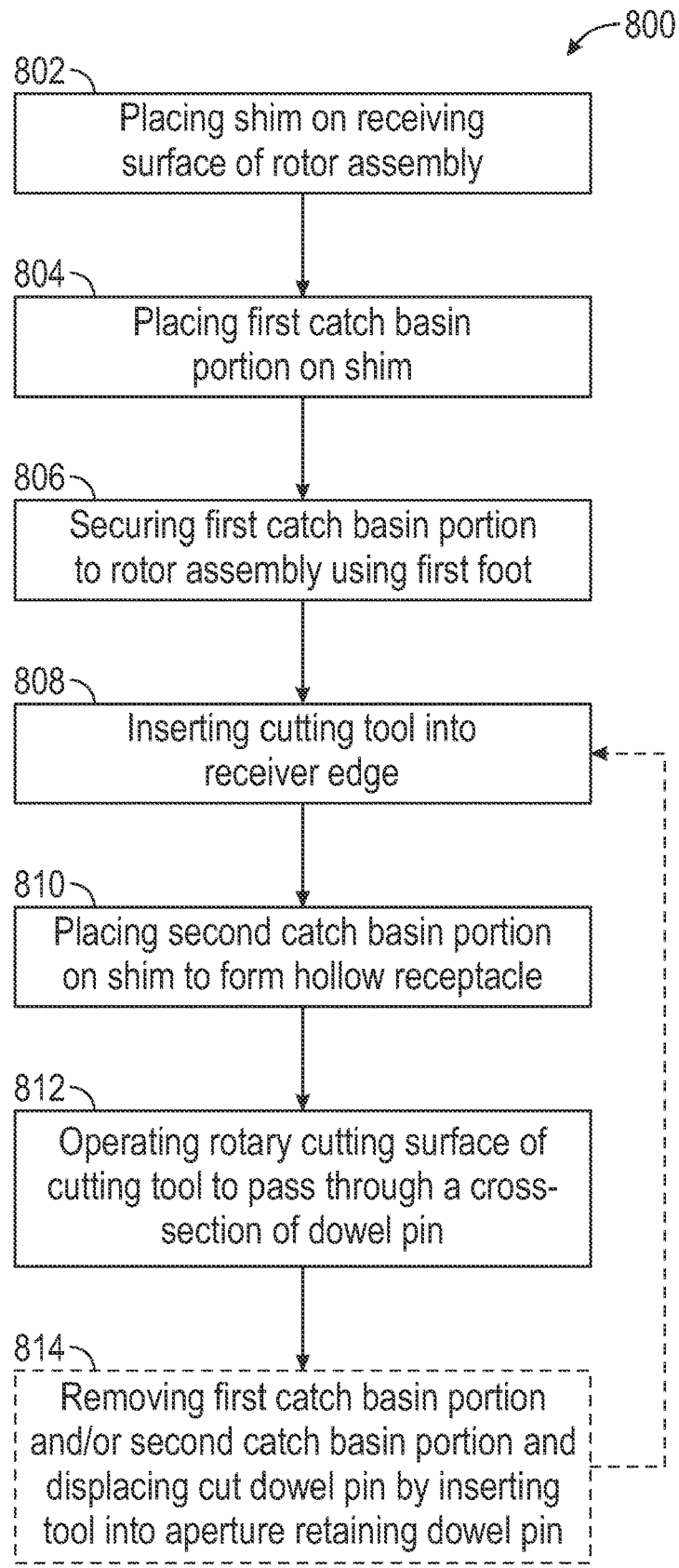
FIG. 19 shows a flow diagram of a method of cutting a dowel pin in a rotor assembly using a guide, such as the exemplary guide shown in FIG. 3, according to an embodiment of the invention.
Figure 20:
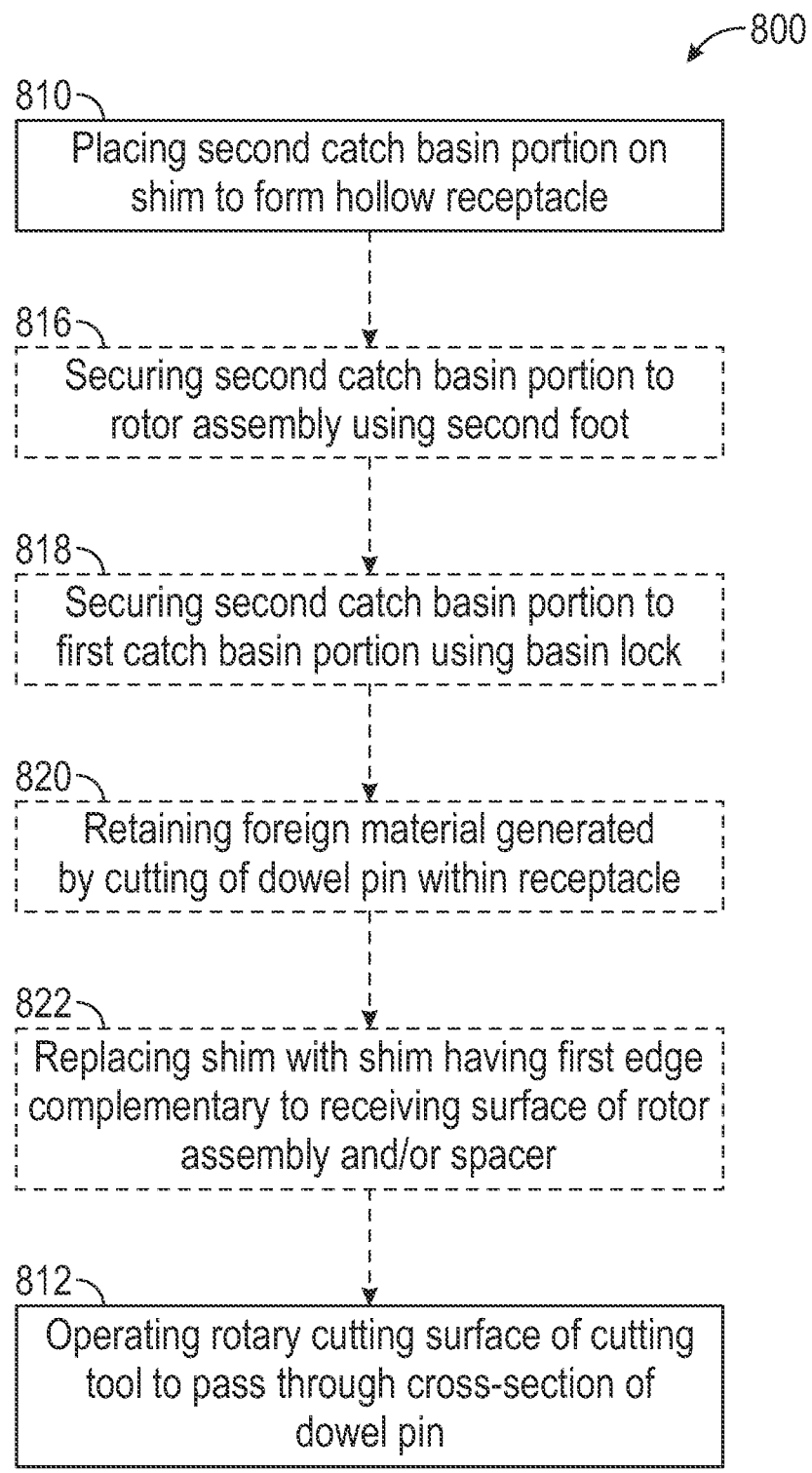
FIG. 20 shows a flow diagram of additional optional steps of the method of FIG. 19, according to an embodiment of the invention.

An exemplary embodiment of a method 800 for cutting a dowel pin in a rotor assembly is illustrated in the flow diagrams in FIGS. 19 and 20. With reference to FIGS. 1-20, the method 800 includes placing 802 a shim 60 on a receiving surface 23 of the rotor assembly 22, placing 804 a first catch basin portion 52 on the shim 60, securing 806 the first catch basin portion 52 to the rotor assembly 22 using a first foot 56 of the first catch basin portion 52, inserting 808 a cutting tool 100 into a receiver edge 53 of the first catch basin portion 52, placing 810 a second catch basin portion 54 on the shim 60 to form a hollow receptacle 55 with the first catch basin portion 52, operating 812 a rotary cutting surface 102 of the cutting tool 100 to pass through a cross-section of the dowel pin 72. The rotary cutting surface 102 is contained within the receptacle 55 during operation of the cutting tool 100.

In certain embodiments, the method 800 includes removing 814 the first catch basin portion 52 and/or the second catch basin portion 54 and displacing 816 the cut dowel pin 72 by inserting a tool (not depicted) into an aperture retaining the cut dowel pin 72. In other words, the tool pushes the cut dowel pin 72 axially to expose an additional portion of the dowel pin 72. In some embodiments, a single cut dowel pin 72 is axially displaced more than once. In some such embodiments, the method 800 includes repeating the steps of inserting 808 the cutting tool 100, placing 810 the first catch basin portion 52 and/or the second catch basin portion 54, securing 806 the first catch basin portion 52, and operating 812 the rotary cutting surface 102 of the cutting tool 100. Additionally or alternatively, in some embodiments the method 800 includes securing 816 the second catch basin portion 54 to the rotor assembly 22 using a second foot 58 of the second catch basin portion 54 before operating 812 the rotary cutting surface 102 of the cutting tool. Additionally or alternatively, in some embodiments the method 800 includes securing 818 the second catch basin portion 54 to the first catch basin portion 52 using a basin lock, retaining 820 foreign material generated by the cutting of the dowel pin 72 within the receptacle 55, and/or replacing 822 the shim 60 with a shim having a first edge complementary to a receiving surface of the rotor assembly 22 and/or the spacer 80.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize. For example, parts, components, steps and aspects from different embodiments may be combined or suitable for use in other embodiments even though not described in the disclosure or depicted in the figures. Therefore, since certain changes may be made in the above-described invention, without departing from the spirit and scope of the invention herein involved, it is intended that all of the subject matter of the above description shown in the accompanying drawings shall be interpreted merely as examples illustrating the inventive concept herein and shall not be construed as limiting the invention.

In this regard, while the disclosed subject matter has been described in connection with various embodiments and corresponding figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below. For example, references to "one embodiment" of the present invention are not intended to be interpreted as excluding the existence of additional embodiments that also incorporate the recited features.

In the appended claims, the terms "including" and "in which" are used as the plain-English equivalents of the respective terms "comprising" and "wherein." Moreover, in the following claims, terms such as "first," "second," "third," "upper," "lower," "bottom," "top," etc. are used merely as labels, and are not intended to impose numerical or positional requirements on their objects. The terms "substantially," "generally," and "about" indicate conditions within reasonably achievable manufacturing and assembly tolerances, relative to ideal desired conditions suitable for achieving the functional purpose of a component or assembly. Further, the limitations of the following claims are not written in means-plus-function format and are not intended to be interpreted as such, unless and until such claim limitations expressly use the phrase "means for" followed by a statement of function void of further structure.

What has been described above includes examples of systems and methods illustrative of the disclosed subject matter. It is, of course, not possible to describe every combination of components or methodologies here. One of ordinary skill in the art may recognize that many further combinations and permutations of the claimed subject matter are possible. Furthermore, to the extent that the terms "includes," "has," "possesses," and the like are used in the detailed description, claims, appendices and drawings, such terms are intended to be inclusive in a manner similar to the term "comprising" as "comprising" is interpreted when employed as a transitional word in a claim. That is, unless explicitly stated to the contrary, embodiments "comprising," "including," or "having" an element or a plurality of elements having a particular property may include additional such elements not having that property. Moreover, articles "a" and "an" as used in the subject specification and annexed drawings should generally be construed to mean "one or more" unless specified otherwise or clear from context to be directed to a singular form.

This written description uses examples to disclose several embodiments of the invention, including the best mode, and also to enable one of ordinary skill in the art to practice the embodiments of invention, including making and using any devices or systems and performing any incorporated methods. The patentable scope of the invention is defined by the claims, and may include other examples that occur to one of ordinary skill in the art. Such other examples are intended to be within the scope of the claims if they have structural elements that do not differ from the literal language of the claims, or if they include equivalent structural elements with insubstantial differences from the literal languages of the claims.

Further aspects of the invention are provided by the subject matter of the following clauses:

A guide for cutting a dowel pin of a rotor assembly including a catch basin including a first catch basin portion and a second catch basin portion and a shim, the first catch basin portion and the second catch basin portion forming a cutting tool receiver, the shim extending from a first edge having a cross-section that is complementary to a surface of the rotor assembly, the first catch basin portion and the second catch basin portion form a receptacle that accommodates and retains portions of a dowel pin during and after removal of the dowel pin from the rotor assembly, and the cutting tool receiver is defined by a receiver edge that guides a cutting surface of a cutting tool through a cross-section of a dowel pin;

A guide including a catch basin and/or a shim defined by a surface complementary to a rotary cutting surface of a cutting tool;

A guide including a catch basin portion and/or a second catch basin portion including a foot configured to releasably mount the catch basin and the shim to the rotor assembly;

A guide including a catch basin including a basin lock configured to affix the first catch basin portion to the second catch basin portion;

A guide including replacing the shim with a shim having a cross-section that is complementary to another surface of the rotor assembly;

A guide including a receiver edge that guides the cutting surface of the cutting tool through the cross-section of the dowel pin without penetrating a lockwire retained within the rotor assembly by the dowel pin;

A guide including a receiver edge having a continuous edge that retains a rotary cutting surface of the cutting tool within the receptacle;

A guide including a shim that contributes to forming the receptacle;

A guide including at least one catch basin portion that extends to a receiver tab to provide a point of contact between the rotor assembly and the at least one catch basin portion;

A guide including a receiver that defines an assembly groove that accommodates the rotor assembly;

A guide including a receiver tab that pushes against the lockwire to serve as an engagement point;

A guide including at least one catch basin portion including a cutting slot that accommodates and allows passage of the rotary cutting surface;

A method of cutting a dowel pin in a rotor assembly including placing a shim on a receiving surface of the rotor assembly, placing a first catch basin portion on the shim, securing the first catch basin portion to the rotor assembly using a foot of the first catch basin portion, inserting a cutting tool into a receiver edge of the first catch basin portion, placing a second catch basin portion on the shim to form a hollow receptacle with the first catch basin portion, and operating a rotary cutting surface of the cutting tool to pass through a cross-section of the dowel pin, with the rotary cutting surface contained within the receptacle during operation of the cutting tool;

A method includes removing the first catch basin portion and/or the second catch basin portion and displacing the cut dowel pin by inserting a tool into an aperture retaining the cut dowel pin;

A method includes repeating the steps of inserting the cutting tool, placing the first catch basin portion and/or the second catch basin portion, securing the first catch basin portion, and operating the rotary cutting surface of the cutting tool;

A method includes securing the second catch basin portion to the rotor assembly using a foot of the second catch basin portion before operating the rotary cutting surface of the cutting tool;

A method includes securing the second catch basin portion to the first catch basin portion using a basin lock;

A method includes retaining foreign material generated by the cutting of the dowel pin within the receptacle;

A method includes replacing the shim with an alternate shim having a first edge complementary to a receiving surface of at least one of the rotor assembly and a spacer;

A guide for cutting a dowel pin of a rotor assembly including a catch basin forming a cutting tool receiver and a receptacle that is configured to accommodate and retain portions of a dowel pin during and after removal of the dowel pin from the rotor assembly, the cutting tool receiver is defined by a receiver edge that guides a cutting surface of a cutting tool through a cross-section of a dowel pin, and the receiver edge is a continuous edge that retains a rotary cutting surface of the cutting tool within the receptacle;

A guide including a catch basin including a first catch basin portion and a second catch basin portion;

A guide including a shim extending from a first edge having a cross-section that is complementary to a surface of the rotor assembly;

A guide including a first catch basin portion and/or a second catch basin portion including a foot configured to releasably mount the catch basin and the shim to the rotor assembly; and A guide including a shim that contributes to forming the receptacle.

What is claimed is:

1. A guide for cutting a dowel pin of a rotor assembly, the guide comprising:
   a catch basin including a first catch basin portion and a second catch basin portion, the first catch basin portion and the second catch basin portion forming a cutting tool receiver; and
   a shim having a first edge with a cross-section that is complementary to a surface of the rotor assembly,
   wherein the first edge of the shim is configured to receive the catch basin thereon and provide support to the catch basin in an abutting position with the rotor assembly,
   wherein the first catch basin portion and the second catch basin portion of the catch basin form a receptacle that is configured to accommodate and retain portions of the dowel pin during and after removal of the dowl pin from the rotor assembly, and
   wherein the cutting tool receiver is defined by a receiver edge configured to guide a cutting surface of a cutting tool through a cross-section of the dowel pin.

2. The guide of claim 1, wherein at least one of the catch basin and the shim is defined by a surface complementary to the cutting surface of the cutting tool.

3. The guide of claim 1, wherein at least one of the first catch basin portion and the second catch basin portion further comprises a foot configured to releasably mount the catch basin and the shim to the rotor assembly.

4. The guide of claim 1, wherein the catch basin further comprises a basin lock configured to affix the first catch basin portion to the second catch basin portion.

5. The guide of claim 1, wherein the shim comprises a cross-section that is complementary to another surface of the rotor assembly.

6. The guide of claim 1, wherein the receiver edge is configured to guide the cutting surface of the cutting tool through the cross-section of the dowel pin without penetrating a lockwire retained within the rotor assembly by the dowel pin.

7. The guide of claim 1, wherein the receiver edge is a continuous edge that retains a rotary cutting surface of the cutting tool within the receptacle.

8. The guide of claim 1, wherein the shim is configured to contribute to forming the receptacle.

9. The guide of claim 1, wherein at least one catch basin portion extends to a receiver tab configured to provide a point of contact between the rotor assembly and the at least one catch basin portion.

10. The guide of claim 9, wherein the receiver tab defines an assembly groove that accommodates the rotor assembly.

11. The guide of claim 9, wherein the receiver tab pushes against a lockwire retained within the rotor assembly by the dowel pin to serve as an engagement point.

12. The guide of claim 1, wherein at least one catch basin portion includes a cutting slot configured to accommodate and allow passage of the cutting surface of the cutting tool.

13. A guide for cutting a dowel pin of a rotor assembly, the guide comprising:
    a catch basin forming a cutting tool receiver and a receptacle that is configured to accommodate and retain portions of the dowel pin during and after removal of the dowl pin from the rotor assembly; and a shim having a first edge with a cross-section that is complementary to a surface of the rotor assembly,
wherein the first edge of the shim is configured to receive the catch basin thereon and provide support to the catch basin in an abutting position with the rotor assembly,
wherein the cutting tool receiver is defined by a receiver edge configured to guide a rotary cutting surface of a cutting tool through a cross-section of the dowel pin, the receiver edge is a continuous edge that retains the rotary cutting surface of the cutting tool within the receptacle.

14. The guide of claim 13, wherein the catch basin further comprises a first catch basin portion and a second catch basin portion.

15. The guide of claim 14, wherein at least one of the first catch basin portion and the second catch basin portion further comprises a foot configured to releasably mount the catch basin and the shim to the rotor assembly.

16. The guide of claim 13, wherein the shim is configured to contribute to forming the receptacle.

17. A method of cutting a dowel pin in a rotor assembly, the method comprising:
placing a shim on a receiving surface of the rotor assembly, wherein the shim includes an edge with a cross-section that is complementary to the surface of the rotor assembly;
placing a first catch basin portion on a first portion of the edge of the shim;
securing the first catch basin portion to the rotor assembly using a foot of the first catch basin portion;
inserting a cutting tool into a receiver edge of the first catch basin portion;
placing a second catch basin portion on a second portion of the edge of the shim to form a hollow receptacle with the first catch basin portion;
operating a rotary cutting surface of the cutting tool to pass through a cross-section of the dowel pin,
wherein the rotary cutting surface is contained within the receptacle during operation of the cutting tool.

18. The method of claim 17, further comprising:
removing at least one of the first catch basin portion and the second catch basin portion;
displacing the cut dowel pin by inserting a tool into an aperture retaining the cut dowel pin.

19. The method of claim 18, further comprising:
repeating the steps of inserting the cutting tool, placing the at least one of the first catch basin portion and the second catch basin portion, securing the first catch basin portion, and operating the rotary cutting surface of the cutting tool.

20. The method of claim 17, further comprising:
securing the second catch basin portion to the rotor assembly using a foot of the second catch basin portion before operating the rotary cutting surface of the cutting tool.

21. The method of claim 17, further comprising securing the second catch basin portion to the first catch basin portion using a basin lock.

22. The method of claim 17, further comprising retaining foreign material generated by the cutting of the dowel pin within the receptacle.

23. The method of claim 17, further comprising replacing the shim with an alternate shim having a first edge complementary to a receiving surface of at least one of the rotor assembly and a spacer.

* * * * *